(12) United States Patent
Okano et al.

(10) Patent No.: US 9,393,875 B2
(45) Date of Patent: Jul. 19, 2016

(54) VEHICLE BRAKING DEVICE

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Takahiro Okano, Chiryu (JP); Yusuke Kamiya, Okazaki (JP); Masaaki Komazawa, Miyoshi (JP)

(73) Assignees: ADVICS CO., LTD., Kariya, Aichi-Pref (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/424,405

(22) PCT Filed: Aug. 27, 2013

(86) PCT No.: PCT/JP2013/072900
§ 371 (c)(1),
(2) Date: Feb. 26, 2015

(87) PCT Pub. No.: WO2014/034678
PCT Pub. Date: Mar. 6, 2014

(65) Prior Publication Data
US 2015/0217644 A1    Aug. 6, 2015

(30) Foreign Application Priority Data
Aug. 30, 2012 (JP) .................................. 2012-190605

(51) Int. Cl.
*B60L 7/22* (2006.01)
*B60L 7/18* (2006.01)
(Continued)

(52) U.S. Cl.
CPC ... *B60L 7/18* (2013.01); *B60L 7/14* (2013.01); *B60L 7/26* (2013.01); *B60T 1/10* (2013.01); *B60T 8/172* (2013.01); *B60L 2250/26* (2013.01); *B60T 2270/604* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,632,534 A | * | 5/1997 | Knechtges | .............. B60L 3/108 180/165 |
| 5,923,093 A | * | 7/1999 | Tabata | ................... B60K 6/365 290/40 C |

(Continued)

FOREIGN PATENT DOCUMENTS

| | | |
|---|---|---|
| DE | 44 35 953 A1 | 5/1995 |
| DE | 198 34 222 A1 | 2/1999 |

(Continued)

OTHER PUBLICATIONS

International Preliminary Report on Patentability (Form PCT/IPEA/409) issued on Oct. 14, 2014, in the corresponding International Application No. PCT/JP2013/072900 and an English translation of the International Preliminary Report on Patentability. (17 pages).

(Continued)

*Primary Examiner* — Jonathan L Sample
(74) *Attorney, Agent, or Firm* — Buchanan Ingersoll & Rooney PC

(57) ABSTRACT

The vehicle braking device has a hydraulic braking force generating device, a regeneration braking force generating device, a braking operation amount detection portion and a required braking force calculation portion. The vehicle braking device controls the hydraulic braking force generating device and the regeneration braking force generating device so as to apply the required braking force to the wheels. The vehicle braking device has a braking force adjustment control portion for executing braking force adjustment control for limiting the rate at which the regeneration braking force is increased and increasing the hydraulic braking force before the current regeneration braking force reaches a maximum regeneration braking force, that is, the maximum braking force that can be generated by the regeneration braking force generating device.

5 Claims, 6 Drawing Sheets

(51) Int. Cl.
  *B60L 7/14*   (2006.01)
  *B60L 7/26*   (2006.01)
  *B60T 1/10*   (2006.01)
  *B60T 8/172*  (2006.01)

(56) References Cited

U.S. PATENT DOCUMENTS

| | | | | |
|---|---|---|---|---|
| 6,216,808 B1* | 4/2001 | Kuno | ............... | B60L 7/26 180/165 |
| 8,303,046 B2* | 11/2012 | Nakata | ............... | B60K 6/445 188/1.11 E |
| 8,366,210 B2* | 2/2013 | Maki | ............... | B60K 6/445 303/151 |
| 2005/0269875 A1* | 12/2005 | Maki | ............... | B60L 7/26 303/152 |
| 2007/0296264 A1* | 12/2007 | Haupt | ............... | B60L 7/26 303/3 |
| 2009/0187320 A1* | 7/2009 | Antanaitis | ............... | B60T 8/172 701/70 |
| 2009/0260901 A1* | 10/2009 | Ishii | ............... | A01D 34/78 180/6.5 |
| 2010/0187901 A1 | 7/2010 | Sonoda et al. | | |
| 2010/0222978 A1* | 9/2010 | Kodama | ............... | B60L 7/26 701/70 |
| 2010/0270854 A1 | 10/2010 | Okano et al. | | |
| 2011/0241417 A1* | 10/2011 | Miyazaki | ............... | B60T 7/042 303/2 |
| 2012/0031692 A1 | 2/2012 | Koike | | |
| 2012/0074768 A1* | 3/2012 | Naito | ............... | B60T 1/10 303/3 |
| 2012/0136547 A1* | 5/2012 | Miyazaki | ............... | B60T 1/10 701/70 |
| 2012/0158266 A1* | 6/2012 | Miyazaki | ............... | B60L 7/18 701/70 |
| 2012/0226402 A1* | 9/2012 | Minamiura | ............... | B60T 1/10 701/22 |
| 2012/0283926 A1* | 11/2012 | Ito | ............... | B60T 8/4018 701/70 |

FOREIGN PATENT DOCUMENTS

| | | |
|---|---|---|
| EP | 2 463 165 A1 | 6/2012 |
| JP | 2006-246614 A | 9/2006 |
| JP | 2008-148534 A | 6/2008 |
| JP | 2009/154600 A | 7/2009 |
| JP | 2010-047201 A | 3/2010 |
| JP | 2012-035705 A | 2/2012 |
| WO | WO 2011/016095 A1 | 2/2011 |

OTHER PUBLICATIONS

European Search Report issued Jan. 21, 2016, by the European Patent Office, in corresponding European Patent Application No. 13832273.0 (9 pages).

International Search Report (PCT/ISA/210) mailed on Oct. 29, 2013, by the Japanese Patent Office as the International Searching Authority for International Application No. PCT/JP2013/072900.

Written Opinion of the International Preliminary Examining Authority (PCT/IPEA/408) mailed on Jul. 29, 2014, by the Japanese Patent Office as the International Searching Authority for International Application No. PCT/JP2013/072900, with English translation and accompanying Amendment under PCT Article 34 submitted on Sep. 26, 2014 (33 pages).

\* cited by examiner

VEHICLE BRAKING DEVICE

TECHNICAL FIELD

This invention relates to a vehicle braking device which applies braking force to wheels of a vehicle by controlling a hydraulic pressure braking force generating device and a regeneration braking force generating device.

BACKGROUND ART

An example of a brake control device for a vehicle is proposed in Patent Literature 1 in which the device performs the cooperative control of the regeneration braking force and the hydraulic pressure braking force. According to the technology disclosed in this Patent Literature 1, the timing at which the regeneration braking force hits a ceiling is detected and at that timing the hydraulic pressure braking force is inflated.

CITATION LIST

Patent Literature

Patent literature 1: JP2009-154600 A

SUMMARY OF INVENTION

Technical Problem(s)

However, according to the technology disclosed in the Patent Literature 1, first, the timing at which the regeneration braking force hits a ceiling and thereafter using such timing, the hydraulic pressure braking force is increased. Accordingly, the timing of increasing the hydraulic pressure braking force is delayed slightly in a practical use and a delay of increasing of the vehicle deceleration occurs which makes the operator of the vehicle feel somewhat weak in braking force and feel different.

Accordingly, this invention was made in consideration with the above-mentioned situation and the objective of the invention is to provide a vehicle braking device that does not make the operator of the vehicle feel any different feeling at the timing at which the regeneration braking force hits a ceiling.

Solution to Problem(s)

The invention associated with a first aspect relates to a vehicle braking device which includes a hydraulic pressure braking force generating device for supplying a wheel cylinder provided at a corresponding vehicle wheel with a braking fluid and generating a hydraulic pressure braking force thereby at the vehicle wheel, a regeneration braking force generating device for generating a regeneration braking force at the vehicle wheel by a generator rotatably connected to the vehicle wheel, a brake operating member, a brake operating amount detecting means for detecting an operating amount of the brake operating member and a required braking force calculating means for calculating a required braking force based on the operating amount of the brake operating member detected by the brake operating amount detecting means, whereby the required braking force is applied to the vehicle wheel by controlling the hydraulic pressure braking force generating device and the regeneration braking force generating device. The vehicle braking device (1) further includes a braking force adjusting control means (4) for executing a braking force adjusting control, in which a required hydraulic pressure braking force, defined to be a braking force obtained by subtracting a current required regeneration braking force from the calculated required braking force, is increased by increasing the current required regeneration braking force as the required braking force is increased towards a maximum regeneration braking force which corresponds to a maximum braking force that the regeneration braking force generating device can generate and limiting an increase ratio of the required regeneration braking force before the required regeneration braking force reaches the maximum regeneration braking force, wherein the braking force adjusting control means does not execute the braking force adjusting control and does not limit the increase ratio of the required regeneration braking force when a time differentiated value of the required braking force before an execution of braking force adjusting control is larger than a predetermined value.

According to the vehicle braking device according to the invention associated with a second aspect, in the first aspect, the braking force adjusting control means calculates an increase amount of the regeneration braking force and an increase amount of the hydraulic pressure braking force under the regeneration braking force and an increase amount of the hydraulic pressure braking force under the braking force adjusting control based on the increase amount of the required braking force for a time period from a current time back to a predetermined time therefrom.

According to the vehicle braking device according to the invention associated with a third aspect, in the first aspect, the braking force adjusting control means does not execute the braking force adjusting control and does not limit the increase ratio of the required regeneration braking force when a value of the hydraulic pressure braking force before the execution of braking force adjusting control is larger than a predetermined value.

According to the vehicle braking device according to the invention associated with a fourth aspect, in the first aspect, the vehicle braking device further includes a maximum regeneration braking force obtaining means which obtains the maximum regeneration braking force by a regeneration braking force control device which controls the regeneration braking force generating device by outputting the regeneration braking force, wherein the braking force adjusting control means executes the braking force adjusting control when a current regeneration braking force reaches to a predetermined ratio of the maximum regeneration braking force.

According to the vehicle braking device according to the invention associated with a fifth aspect, in the first aspect, the vehicle braking device further includes a maximum regeneration braking force calculating means which calculates the maximum regeneration braking force based on a vehicle speed or a rotation speed of the generator, wherein the braking force adjusting control means executes the braking force adjusting control when a current regeneration braking force reaches to a predetermined ratio of the maximum regeneration braking force.

Advantageous Effects of Invention

According to the invention of the first aspect the braking force adjusting control means executes an adjusting control for the required braking force by the sum of the regeneration braking force and the hydraulic pressure braking force and increases the regeneration braking force in response to the increase of the required braking force and controls the difference between the required braking force and the regeneration braking force to generate the hydraulic pressure braking force for braking operation. Further, the braking force adjusting control means executes the braking force adjusting control in which the increase ratio of the required regeneration braking force is limited before the current required regeneration braking force reaches to the maximum regeneration braking force which corresponds to the maximum braking force that the regeneration braking force generating device can generate. Thus, since the hydraulic pressure braking force is increased before the regeneration braking force hits the ceiling, the vehicle deceleration can be increased. Accordingly, any different feeling by an operator of the vehicle due to the drop of vehicle deceleration decreasing ratio upon the regeneration braking force hitting the ceiling, can be minimized.

Further, before the regeneration braking force hits the ceiling, the hydraulic pressure braking force is increased. Accordingly, a deficiency of the actual braking force (sum of the regeneration braking force and the hydraulic pressure braking force) derived from the hitting of the ceiling of the regeneration braking force can be compensated by the increase of the required hydraulic pressure braking force. Further, according to the invention, since the increase ratio of the regeneration braking force upon the increasing of the hydraulic pressure braking force is limited, an excess increase of vehicle deceleration can be prevented by controlling the sum of the regeneration braking force and the hydraulic pressure braking force to exceed the required braking force in response to the increase of the hydraulic pressure braking force.

The braking force adjusting control means is not executed when a time differentiated value of the required braking force before the execution of braking force adjusting control is more than a predetermined value. Generally, according to the regeneration cooperative control, higher the ratio of the hydraulic pressure braking force relative to the regeneration braking force, larger the value of the time differentiated required braking force becomes and accordingly the hydraulic pressure braking force has already generated. When the hydraulic pressure braking force is already generated, even the regeneration braking force hits the ceiling, no time lag of hydraulic pressure braking force generation occurs. Accordingly, a drop of deceleration of the vehicle is prevented even the braking force adjusting control is not executed. When the time differentiated value of the required braking force before the execution of braking force adjusting control is more than a predetermined value, the braking force adjusting control is not executed and accordingly, the increase ratio of the regeneration braking force is not limited thus, converting the vehicle kinetic energy more into the electric energy.

According to the invention of the second aspect, the braking force adjusting control means calculates an increase amount of the regeneration braking force and an increase amount of the hydraulic pressure braking force under the braking force adjusting control execution based on an increase amount of the required braking force for a time period from a current time back to a predetermined time therefrom. Thus, a sharp change of the regeneration braking force and the hydraulic pressure braking force relative to the change of the operating amount of the brake operating member by the operator of the vehicle can be minimized.

According to the invention of the vehicle braking device associated with the third aspect, the braking force adjusting control means does not execute the braking force adjusting control and does not limit the increase ratio of the required regeneration braking force when a value of the hydraulic pressure braking force before the execution of braking force adjusting control is larger than a predetermined value. If already the hydraulic pressure braking force has been generated more than the predetermined value, even if the regeneration braking force hits the ceiling, the hydraulic pressure braking force is increased without generating a time lag of generation of the hydraulic pressure braking force and accordingly, the actual braking force which is the sum of the regeneration braking force and the hydraulic pressure braking force is generated without generating a time lag relative to the required braking force. This can avoid vehicle deceleration deficiency derived from the time lag of generation of the hydraulic pressure braking force. Accordingly, when the hydraulic pressure braking force before executing braking force adjusting control is larger than the predetermined value, the braking force adjusting control means does not execute the braking force adjusting control and does not limit the increase ratio of the required regeneration braking force thus, converting the vehicle kinetic energy more into the electric energy.

According to the invention of the vehicle braking device associated with the fourth aspect, a maximum regeneration braking force obtaining means obtains the maximum regeneration braking force by a regeneration braking force control device which controls the regeneration braking force generating device by outputting the regeneration braking force and the braking force adjusting control means executes the braking force adjusting control when the current regeneration braking force reaches to a predetermined ratio of the maximum regeneration braking force. Since the regeneration braking force control device directly controls the regeneration braking force generating device, highly accurate maximum regeneration braking force can be obtained. Further, since the maximum regeneration braking force obtaining means obtains the maximum regeneration braking force from the maximum regeneration braking force control device, the braking force adjusting control means can judge accurately and properly the initiation timing of the braking force adjusting control execution. In this regard, since before the regeneration braking force hits the ceiling, the braking force adjusting control starts execution more assuredly, more assuredly the vehicle deceleration can be increased. Further, since the regeneration braking force can be more frequently generated at the regeneration braking force generating device, more electric energy can be converted from the kinetic energy of the vehicle.

According to the invention of the vehicle braking device associated with the fifth aspect, the vehicle braking device further includes a maximum regeneration braking force calculating means which calculates the maximum regeneration braking force based on a vehicle speed or a rotation speed of the generator, wherein the braking force adjusting control means executes the braking force adjusting control when the current regeneration braking force reaches to a predetermined ratio of the maximum regeneration braking force. Accordingly, the braking force adjusting control can be executed under a vehicle braking device which does not obtain the maximum regeneration braking force from the regeneration braking force control device which controls the regeneration braking force generating device.

DESCRIPTION OF EMBODIMENTS (Structure of Vehicle Braking Device)

An embodiment of the vehicle braking device according to the invention will be explained with reference to FIG. 1. The hybrid vehicle (hereinafter referred to as simply "vehicle") on which the vehicle braking device is installed is driven by the engine (not shown) and the motor/generator 31 which drive the vehicle wheels (drive wheels) such as front right and left wheels 5FR and 5FL.

Figure 1:
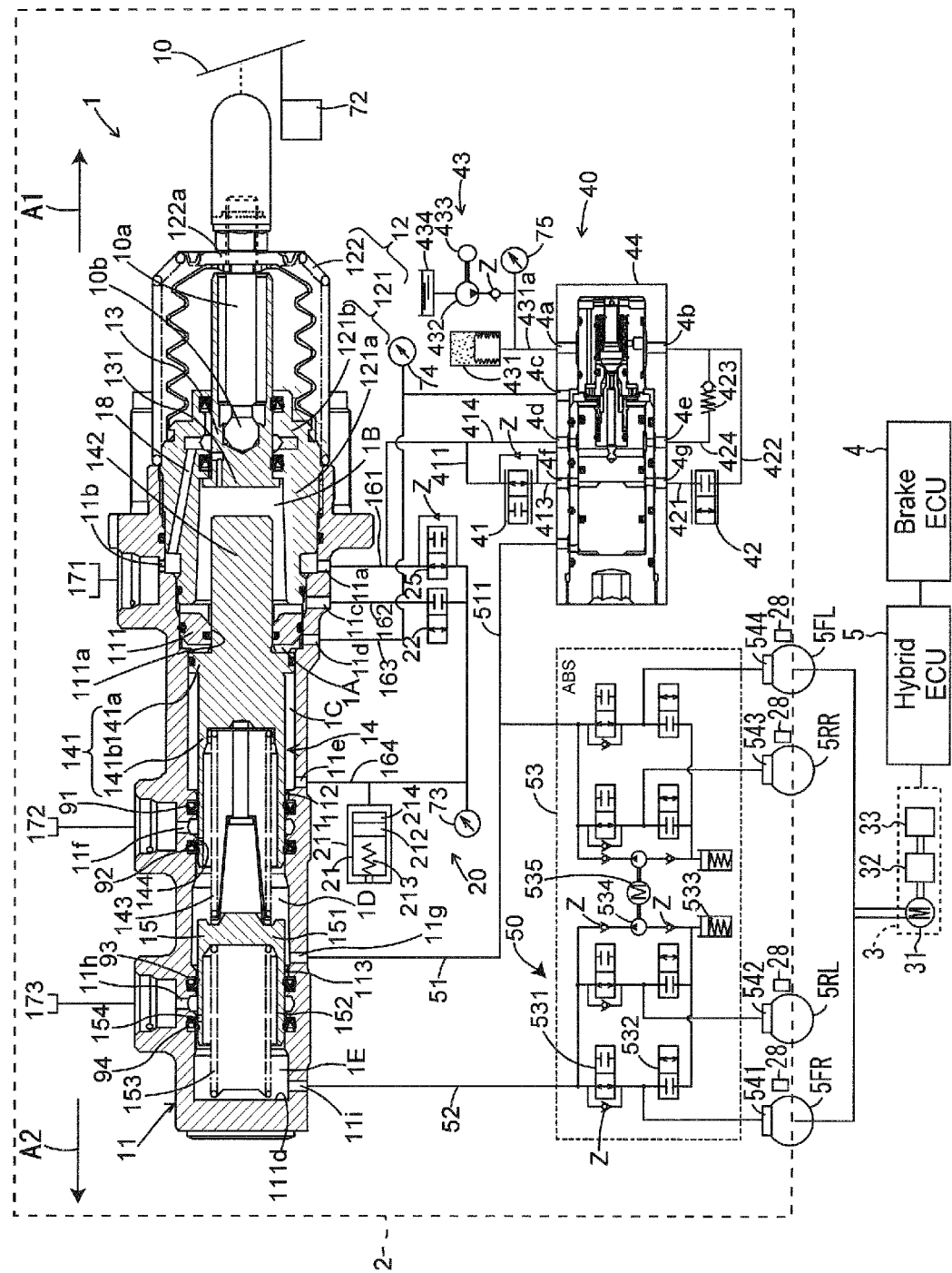
FIG. 1 is an outline structure of the vehicle braking device according to an embodiment.

As shown in FIG. 1, the vehicle braking device is mainly formed by a hydraulic pressure braking force generating device 2 which generates the hydraulic pressure braking force (friction braking force) at the vehicle wheels, a regeneration braking force generating device 3 which generates the regeneration braking force at the vehicle wheels, a brake ECU 4 which controls the hydraulic pressure braking force generating device 2 and a hybrid ECU 5 which controls the regeneration braking force generating device 3.

(Hydraulic Pressure Braking Force Generating Device)

The hydraulic pressure braking force generating device 2 includes a master cylinder 1, a reaction force generating device 20, a separation lock valve 22, a reaction force valve 25, a servo pressure generating device 40, an ABS actuator 53, wheel cylinders 541 through 544 and various sensors 28, and 72 through 75, which are communicable with the brake ECU 4.

(Master Cylinder 1)

The master cylinder 1 supplies the wheel cylinders 541 through 544 with a braking fluid by way of the ABS actuator 53 and is formed mainly by a main cylinder 11, a cover cylinder 12, an input piston 13, a first master piston 14 and a second master piston 15.

The main cylinder 11 is formed in a substantially bottomed cylinder shape having an opening at one end thereof and a bottom surface at the other end. Hereinafter, the master cylinder 1 will be explained defining the opening side of the main cylinder 11 as a rear (direction shown by an arrow A1) and the bottom surface side thereof as a front ((in the arrow A2 direction side). The main cylinder 11 includes therein an inner wall portion 111, which separates the opening side (in the arrow A1 direction side) and the bottom surface side in (in the arrow A2 direction side) of the main cylinder 11. An inner circumferential surface of the inner wall portion 111 is provided with a through-hole 111a at a central portion thereof which penetrates the cylinder through in an axial direction (in a front-rear direction).

The main cylinder 11 includes therein a small diameter portion 112 (rear side) and also a small diameter portion 113 (front side). The inner diameter of the main cylinder 11 is set to be smaller than the rest at these portions which are located forwardly of the inner wall portion 111. In other words, the small diameter portions 112, 113 project from the entire inner circumferential surface of a portion of the main cylinder 11 in an axial direction. The mentioned master pistons 14, 15 which will be explained later, are provided inside the main cylinder 11, while allowing the master pistons 14, 15 to be slidably movable in the axial direction. Ports etc., which interconnect the inside and outside of the main cylinder 11 will be also described later.

The cover cylinder 12 includes a cylinder portion 121 in a substantially cylindrical shape and a cup-shaped compression spring 122. The cylinder portion 121 is arranged at a rear end of the main cylinder 11 and is coaxially fitted into the opening of the main cylinder 11. An inner diameter of a front portion 121a of the cylinder portion 121 is formed to be greater than an inner diameter of a rear portion 121b thereof. Furthermore, the inner diameter of the front portion 121a is formed to be greater than an inner diameter of the through-hole 111a of the inner wall portion 111.

The compression spring 122 is attached to the rear end portion of the main cylinder 11 and an outer circumferential surface of the cylinder portion 121 so as to cover the opening of the main cylinder 11 and a rear end opening of the cylinder portion 121. A flange 122a of an operation rod 10a is formed at a bottom wall of the compression spring 122. The compression spring 122 is made of an elastic material expandable and contractible in the axial direction and the bottom wall thereof is biased in a rearward direction.

The input piston 13 is configured to slidably move inside the cover cylinder 12 in response to an operation of a brake pedal 10. The input piston 13 is formed to be of cylindrical shape having an opening at a rear end and a bottom at front end. A bottom wall 131 forming the bottom of the input piston 13 has a diameter larger than the rest of the input piston 13 thereof. The bottom wall 131 is located at a rear end of the front portion of the cylinder portion 121. The input piston 13 is liquid-tightly disposed in the cylinder 121 at a rear portion 121b and is slidable in an axial direction.

An operation rod 10a of the brake pedal 10 and a pivot 10b are disposed inside of the input piston 13. The operation rod 10a projects towards the outside through the opening of the input piston 13 and the flange 122a of the cover member 122, and is connected to the brake pedal 10. The operation rod 10a moves in response to the operation of the brake pedal 10. More specifically, when the brake pedal 10 is depressed, the operation rod 10a advances in a forward direction while pressing the compression spring 122 in the axial direction. The input piston 13 also advances in response to the forward movement of the operation rod 10a.

The first master piston 14 is arranged within the main cylinder 11 and is slidably movable in the axial direction. More specifically, the first master piston 14 includes a first main body portion 141 and a projection portion 142. The first main body portion 141 is arranged coaxially within the main cylinder 11 at a location forward of the inner wall portion 111. The first main body portion 141 is formed in a substantially bottomed cylinder shape having an opening at a front portion thereof and a flange 141a at a rear portion thereof. In other words, the first main body portion 141 includes the flange 141a and a circumferential wall portion 141b.

The flange 141a is provided inside the main cylinder 11 at a location forward of the inner wall portion 111 in a liquid-tight manner while allowing the flange 141a to be slidably movable in the axial direction. The circumferential wall portion 141b is formed in a cylinder shape having a smaller diameter than the flange 141a and extends coaxially from a front end surface of the flange 141a in the forward direction. A front portion of the circumferential wall portion 141b is provided to be slidably movable in the axial direction relative to the small diameter portion 112 and in liquid-tightly therewith, while allowing the front portion of the circumferential wall portion 141b to be slidably movable in the axial direction relative to the small diameter portion 112. A rear portion of the circumferential wall portion 141b is spaced apart from the inner circumferential surface of the main cylinder 11.

The projection portion 142 is a columnar-shaped portion projecting rearward from a center of a rear end surface of the first main body portion 141. The projection portion 142 is provided so as to penetrate into the through-hole 111a of the inner wall portion 111 and to be slidably movable in the axial direction. A rear portion of the projection portion 142 projects rearward from the through-hole 111a to the inside of the cylinder portion 121. The rear portion of the projection portion 142 is spaced apart from an inner circumferential surface of the cylinder portion 121. A rear end surface of the projection portion 142 is spaced apart from the bottom wall 131 of the input piston 13 by a predetermined distance. The first master piston 14 is biased in the rearward direction by a biasing member 143 formed by, for example, a spring.

"A servo chamber 1A" is defined by a rear end surface of the flange 141a formed at the first main body portion 141, the front end surface of the inner wall portion 111, an inner circumferential surface of the main cylinder 11 and an outer circumferential surface of the projection portion 142. "A separation chamber 1B" is defined by a rear end surface of the inner wall portion 111, an outer surface of the input piston 13, an inner circumferential surface of the front portion 121a of the cylinder portion 121 and an outer surface of the projection portion 142. "A reaction force chamber 1C" is defined by a rear end surface of the small diameter portion 112 (including a sealing member 91), an outer circumferential surface of the first master piston 14 and the inner circumferential surface of the main cylinder 11.

The second master piston 15 is coaxially arranged within the main cylinder 11 at a location forward of the first master piston 14. The second master piston 15 is formed in a substantially bottomed cylinder shape having an opening at a front portion thereof and a bottom wall 151 at a rear portion thereof. The second master piston 15 includes the bottom wall 151 and a circumferential wall portion 152 having the same diameter with the bottom wall 151. The bottom wall 151 is arranged between the small diameter portions 112, 113 at a location forward of the first master piston 14. The rear portion of the second master piston 15 including the bottom wall 151 is spaced apart from the inner circumferential surface of the main cylinder 11. The circumferential wall portion 152 is formed in a cylindrical shape and coaxially and extends forward from an outer edge of the bottom wall 151. The circumferential wall portion 152 is liquid-tightly provided slidably movable in the axial direction relative to the small diameter portion 113 and in liquid-tightly therewith, while allowing the circumferential wall portion 152 to be slidably movable within the small diameter portion 113 in the axial direction. The second master piston 15 is biased in the rearward direction by a biasing member 153 formed, for example, by a spring.

"A first master chamber 1D" is defined by a space within the main cylinder 11 between the first master piston 14 and the second master piston 15. Furthermore, "a second master chamber 1E" is defined by a space in the main cylinder 11 divided by the second master piston 15.

Ports 11a to 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylinder portion 121. The port 11a is connected to a conduit 161. The port 11b is connected to a reservoir 171. In other words, the port 11a is in communication with the reservoir 171.

The port 11b is in communication with the separation chamber 1B via a passage 18 formed at the cylinder portion 121 and the input piston 13. The passage 18 is separated when the input piston 13 moves forward. In other words, when the input piston 13 moves forward, the separation chamber 1B and the reservoir 171 are disconnected from each other.

The port 11c is formed at a location forward of the port 11a and connects the separation chamber 1B with a conduit 162. The port 11d is formed at a location forward of the port 11c and connects the servo chamber 1A with a conduit 163. The port 11e is formed at a location forward of the port 11d and connects the reaction force chamber 1C with a conduit 164. The hydraulic pressure sensor 74 is connected to the conduit 163 for detecting the pressure in the servo chamber 1A (servo pressure).

The port 11f is formed between the sealing members 91, 92 of the small diameter portion 112 and connects a reservoir 172 with the inside of the main cylinder 11. The port 11f is in communication with the first master chamber 1D via a passage 144 formed at the first master piston 14. The passage 144 is formed at a location slightly rearward of the sealing member 92 so that the port 11f and the first master chamber 1D are disconnected from each other when the first master piston 14 moves forward.

The port 11g is formed at a location forward of the port 11f and connects the first master chamber 1D with a conduit 51. The port 11h is formed between the sealing members 93 and 94 of the small diameter portion 113 and connects a reservoir 173 with the inside of the main cylinder 11. The port 11h is in communication with the second master chamber 1E via a passage 154 formed at the second master piston 15. The passage 154 is formed at a location slightly rearward of the sealing member 94 so that the port 11g and the second master chamber 1E are disconnected from each other when the second master piston 15 moves forward. The port 11i is formed at a location forward of the port 11h and connects the second master chamber 1E with a conduit 52.

Sealing members such as O-rings and the like (see black dots in FIGURE) are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additional sealing members are provided between the input piston 13 and the cylinder portion 121. A stroke sensor 72 is provided at the brake pedal 10. The stroke sensor 72 detects a stroke amount str (operation amount by the operator of the vehicle) of the brake pedal 10 and the detected result is sent to the brake ECU 4.

(Reaction Force Generating Device 20)

The reaction force generating device 20 includes a stroke simulator 21. The stroke simulator 21 generates a reaction force pressure Pr in the reaction force chamber 1C in response to the stroke amount "str" of the brake pedal 10 depressed by the driver of the vehicle through the separation chamber 1B. Generally, the stroke simulator 21 is configured in such a manner that a piston 212 is fitted into a cylinder 211 while being allowed to slidably move therewith and a simulator fluid chamber 214 is formed at a location forward of the piston 212, which is biased in the backward direction by a compression spring 213. The stroke simulator 21 is connected to the reaction force chamber 1C via the conduit 164 and the port 11*e*, and is connected to the separation lock valve 22 and the reaction force valve 25 via the conduit 164.

(Separation Lock Valve 22)

The separation lock valve 22 is a normally-closed-type electromagnetic valve and is configured so that opening and closing thereof are controlled by the brake ECU 4. The separation lock valve 22 is connected to the conduit 164 and the conduit 162, and is configured to connect/disconnect the conduit 162 with/from the conduit 164. The separation lock valve 22 is an open/close valve for connecting/disconnecting the separation chamber 1B with/from the reaction force chamber 1C.

(The Reaction Force Valve 25)

The reaction force valve 25 is a normally-open-type electromagnetic valve and is configured so that opening and closing thereof is controlled by the brake ECU 4. The reaction force valve 25 is connected to the conduit 164 and the conduit 161, and is configured to connect/disconnect the conduit 161 with/from the conduit 164. The reaction force valve 25 is a valve which connects/disconnects the separation chamber 1B and the reaction force chamber 1C with/from the reservoir 171 when the separation lock valve 22 is in a closed state.

(Control of the Separation Lock Valve 22 and the Reaction Force Valve 25)

The control of the reaction force valve 25 and the separation lock valve 22 by the brake ECU 4 under a braking operation will be explained hereinafter. When the brake pedal 10 is depressed, the input piston 13 advances to interrupt the fluid flow through the passage 18 to thereby interrupt the fluid communication between the reservoir 171 and the separation chamber 1B. At the same time, the brake ECU 4 controls the reaction force valve 25 to be in a closed state from an open state and controls the separation lock valve 22 to be in an open state from a closed state. The fluid communication between the reaction force chamber 1C and the reservoir 171 is interrupted by the closing of the reaction force valve 25 and the fluid communication between the separation chamber 1B and the reaction chamber 1C is established by the opening of the separation lock valve 22. In other words, when the input piston 13 advances and the reaction force valve 25 is closed, the separation chamber 1B and the reaction force chamber 1C are disconnected from the fluid communication with the reservoir 171. Then the stroke simulator 21 generates the reaction force pressure Pr in the separation chamber 1B and the reaction force chamber 1C, which corresponds to the stroke amount "str" of the brake pedal 10 depressed by the driver. Under such situation, the braking fluid flowing into or out of the reaction force chamber 1C is the same amount with the braking fluid flowing into or out of the separation chamber 1B in response to the movements of the first master piston 14 and the second master piston 15.

(The Servo Pressure Generating Device 40)

The servo pressure generating device 40 mainly includes a pressure decreasing valve 41, a pressure increasing valve 42, a pressure supplying portion 43 and a regulator 44. The pressure decreasing valve 41 is a normally-open-type electromagnetic valve (linear electromagnetic valve) and flow-rate therethrough is controlled by the brake ECU 4. One outlet/inlet of the pressure decreasing valve 41 is connected to the conduit 161 via a conduit 411, and the other outlet/inlet of the pressure decreasing valve 41 is connected to a conduit 413. More specifically, the one outlet/inlet of the pressure decreasing valve 41 is in communication with the reservoir 171 via the conduits 411, 161, and ports 11*a*, 11*b*. The pressure increasing valve 42 is a normally-closed-type electromagnetic valve (linear electromagnetic valve) and is configured so that a flow-rate thereof is controlled by the brake ECU 4. One outlet/inlet of the pressure increasing valve 42 is connected to a conduit 421, and the other outlet/inlet of the pressure increasing valve 42 is connected to a conduit 422.

The pressure supplying portion 43 supplies the regulator 44 with the braking fluid under high pressure on the basis of a command from the brake ECU 4. The pressure supplying portion 43 mainly includes an accumulator 431, a pump 432, a motor 433 and a reservoir 434.

The accumulator 431 accumulates the hydraulic pressure generated by the pump 432. The accumulator 431 is connected to the regulator 44, a hydraulic pressure sensor 75 and the pump 432 via a conduit 431*a*. The pump 432 is connected to the motor 433 and the reservoir 434. The pump 432 supplies the accumulator 431 with the braking fluid accumulated in the reservoir 434 by driving the motor 433. The hydraulic pressure sensor 75 detects the hydraulic pressure of the braking fluid accumulated in the accumulator 431. The hydraulic pressure detected by the hydraulic pressure sensor 75 is defined to be an accumulator pressure Pac.

When the hydraulic pressure sensor 75 detects that the accumulator pressure Pac decreases to a value equal to or less than a predetermined value, the motor 433 is driven on the basis of a control signal from the brake ECU 4 and the pump 432 supplies the accumulator 431 with the braking fluid in order to supplement a pressure energy to the accumulator 431.

Figure 6:
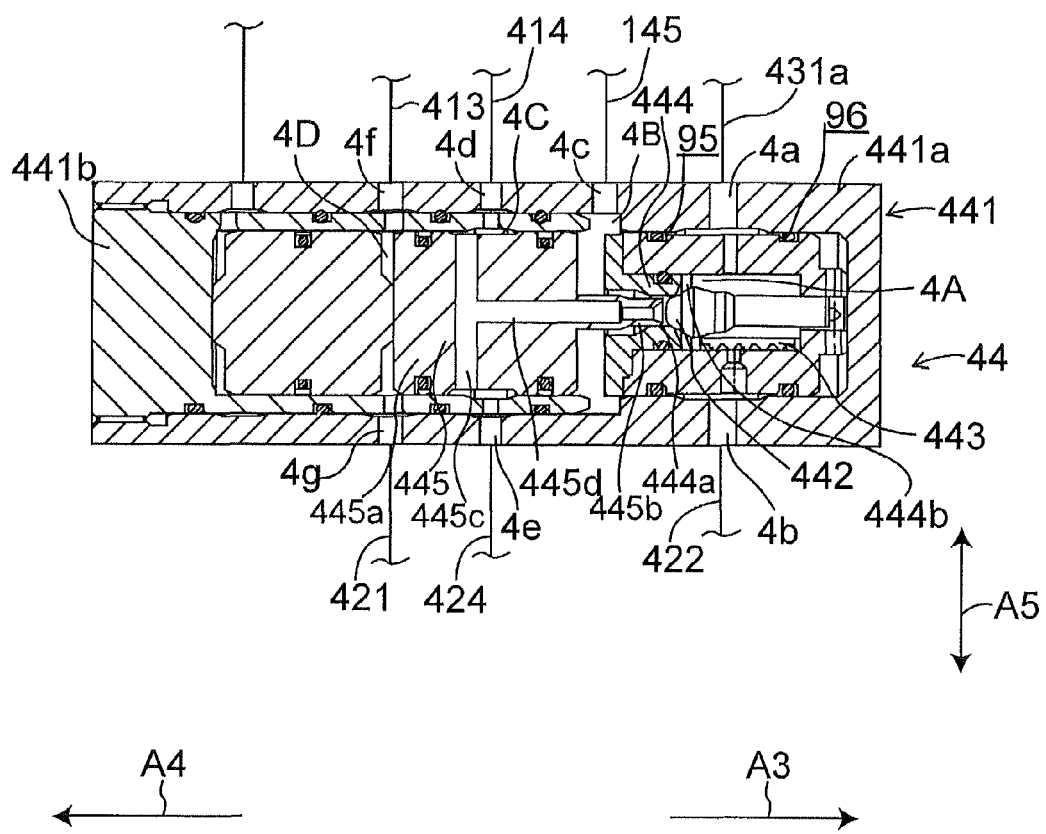
FIG. 6 is a partial sectional view of an example of a regulator structure.

FIG. 6 is a partial cross sectional view of an example of the structure of the regulator 44 shown in FIG. 1. As shown in the drawing, the regulator 44 mainly includes a cylinder 441, a ball valve 442, a biasing portion 443, a valve seat portion 444 and a control piston 445.

The cylinder 441 includes a cylinder case 441*a* formed in a substantially bottomed cylinder-shape having a bottom surface at one end thereof ((in the arrow A3 direction side), and a cover member 441*b* closing an opening side (in the arrow A4 direction side) of the cylinder case 441*a*. The cylinder case 441*a* is provided with plural ports 4*a* to 4*g* through which the inside and the outside of the cylinder case 441*a* are communicable.

The port 4*a* is connected to the conduit 431*a*. The port 4*e* is connected to the conduit 424. The port 4*c* is connected to the conduit 163. The port 4*d* is connected to the conduit 161 via the conduit 414. The port 4*b* is connected to a conduit 424, which is connected to the conduit 422 via a relief valve 423. The port 4*f* is connected to the conduit 413. The port 4*g* is connected to the conduit 421.

The ball valve 442 is a valve having a ball shape. The ball valve 442 is provided within the cylinder 441 at the bottom surface side (in the arrow A3 direction side and hereinafter this portion will be referred to as a cylinder bottom surface side) of the cylinder case 441*a*. The biasing portion 443 includes a spring member biasing the ball valve 442 towards the opening side (in the arrow A4 direction side and hereinafter this portion will be referred to as a cylinder opening side) of the cylinder case 441*a* and is provided at the bottom surface of the cylinder case 441*a*. The valve seat portion 444 includes a wall member provided at the inner peripheral surface of the cylinder case 441*a* and divides the inside of the cylinder case 441*a* into the cylinder opening side (in the arrow A4 direction side) and the cylinder bottom surface side (in the arrow A3 direction side) and a through passage 444*a* is formed at the central portion of the valve seat portion 444 for fluid communication between the cylinder opening side (in the arrow A4 direction side) and the cylinder bottom surface side (in the arrow A3 direction side). The valve seat portion 444 supports the ball valve 442 from the cylinder opening side (in the arrow A4 direction side) by closing the through passage 444a by the biased ball valve 442.

A space defined by the ball valve 442, the biasing portion 443, the valve seat portion 444, and an inner circumferential surface of the cylinder case 441a of the cylinder bottom surface (in the arrow A3 direction side) is referred to as "a first chamber 4A". The first chamber 4A is filled with the braking fluid and is connected to the conduit 431a via the port 4a and further to the conduit 422 via the port 4b.

The control piston 445 includes a main body portion 445a formed in a substantially columnar shape and a projection portion 445b formed in a substantially columnar shape having a smaller diameter than the diameter of the main body portion 445a. The main body portion 445a is provided inside the cylinder 441 in a coaxial and liquid-tight manner relative to the cylinder opening side (in the arrow A4 direction side) of the valve seat portion 444, while allowing the main body portion 445a to be slidably movable in the axial direction. The main body portion 445a is biased towards the cylinder opening side (in the arrow A4 direction side) by means of a biasing member, which is not illustrated in the drawings. A passage 445c is formed at a substantially intermediate portion of the main body portion 445a in the cylinder axial direction. The passage 445c extends in a peripheral direction (in the arrow A5 direction) so that both end portions thereof open at a circumferential surface of the main body portion 445a. A portion of the inner circumferential surface of the cylinder 441 corresponding to the location of the opening of the passage 445c is provided with the port 4d and is formed to be recessed so as to form a third chamber 4C together with the main body portion 445a.

The projection portion 445b projects towards the cylinder bottom surface side (in the arrow A3 direction side) from a center portion of an end surface of the main body portion 445a facing the cylinder bottom surface (in the arrow A3 direction side). The projection portion 445b is formed so that the diameter thereof is smaller than the diameter of the through passage 444a of the valve seat portion 444. The projection portion 445b is provided coaxially with the through passage 444a. An end portion of the projection portion 445b is spaced apart from the ball valve 442 towards the cylinder opening side (in the arrow A4 direction side) by a predetermined distance. A passage 445d is formed at the projection portion 445b so that the passage 445d extends in the cylinder axial direction and opens at a center portion of an end surface of the projection portion 445b facing the cylinder bottom surface (in the arrow A3 direction side). The passage 445d extends into the inside of the main body portion 445a and is connected to the passage 445c.

A space defined by the end surface of the main body portion 445a at the cylinder bottom surface (in the arrow A3 direction side), an outer surface of the projection portion 445b, the inner circumferential surface of the cylinder 441, the valve seat portion 444 and the ball valve 442 is referred to as a "second chamber 4B". The second chamber 4B is in communication with the ports 4d, 4e via the passages 445c, 445d and the third chamber 4C.

A space defined by the end surface of the control piston 445, at the cylinder bottom surface (in the arrow A4 direction side) and the inner circumferential surface of the cylinder 441 is referred to as "a pilot chamber 4D". The pilot chamber 4D is in communication with the pressure decreasing valve 41 via the port 4f and the conduit 413, and further in communication with the pressure increasing valve 42 via the port 4g and the conduit 421.

A sealing member such as an O-ring and the like (see black dots in the drawings) is appropriately provided within the regulator 44. Particularly, the sealing members 95 and 96 are provided at the control piston 445 and are liquid-tightly in contact with the inner circumferential surface of the cylinder case 441a.

(ABS Actuator 53 and Wheel Cylinders 541 to 544)

The first master chamber 1D and the second master chamber 1E, in which a master pressure is generated, are in communication with the wheel cylinders 541 through 544 via the conduits 51, 52, and the ABS actuator 53. The wheel cylinders 541 to 544 form a braking device 50 at each vehicle wheel 5FR to 5RL. More specifically, the known ABS (Antilock Brake System) actuator 53 is connected to the port 11g of the first master chamber 1D and the port 11i of the second master chamber 1E via the conduits 51, 52, respectively. The ABS actuator 53 is connected to the wheel cylinders 541 through 544, which apply braking force to the vehicle wheels 5FR through 5RL.

The ABS actuator 53 is explained with a configuration of one of the four wheels (5FR) as an example, and explanation about other wheels will be omitted because all four wheels are configured the same. The ABS actuator 53 includes a holding valve 531, a pressure decreasing valve 532, a reservoir 533, a pump 534, and a motor 535. The holding valve 531 is a normally-open-type electromagnetic valve and is configured so that opening and closing thereof is controlled by the brake ECU 4. The holding valve 531 is arranged so that one side is connected to the conduit 52 and the other side is connected to the wheel cylinder 541 and the pressure decreasing valve 532. In other words, the holding valve serves as an input valve for ABS actuator 53.

The pressure decreasing valve 532 is a normally closed type electromagnetic valve and opening and closing operation thereof is controlled by the brake ECU 4. The pressure decreasing valve 532 is connected to the wheel cylinder 541 and the holding valve 531 at one side thereof and is connected to the reservoir 533 at the other side. When the pressure decreasing valve 532 is open, the communication between the wheel cylinder 541 and the reservoir 533 is established.

The reservoir 533 stores the braking fluid and is connected to the conduit 52 via the pressure decreasing valve 532 and the pump 534. The pump 534 is connected to the reservoir 533 at the suction port and the discharge port is connected to the conduit 52 via the one-way valve "z". It is noted here that the one-way valve "z" allows the flow from the pump 534 to the conduit 52 (the second master chamber 1E) but restricts the flow in the opposite direction. The pump 534 is driven by the motor 535 which is actuated by a command from the brake ECU 4. The pump 534 suctions the braking fluid stored in the reservoir 533 or in the wheel cylinder 541 and returns the fluid into the second master chamber 1E under the pressure decreasing mode of the ABS control. It is noted that a damper (not shown) is provided in the upper stream side of the pump 534 to dampen the pulsation of the braking fluid discharged from the pump 534.

The brake ECU 4 executes ABS control (Anti-Lock Brake Control) by actuating the ABS actuator 53 to control opening and closing operations of the electromagnetic valves 531 and 532 based on the master pressure, vehicle wheel speed and front/rear acceleration and when necessary, by actuating the motor 535 to adjust the braking hydraulic pressure to the wheel cylinder 541, i.e., to adjust braking force applied to the vehicle wheel 5FR. Based on the instructions from the brake ECU 4, the ABS actuator 53 supplies the wheel cylinders 541 to 544 with the hydraulic braking pressure by adjusting the amount of the braking fluid supplied from the master cylinder 1 or the timing of supply thereof.

It is noted here that one-way valves "z" are appropriately provided in the pressure decreasing valve 41, the reaction force valve 25, the pressure supplying portion 43 and the ABS actuator 53.

(Various Sensors)

The vehicle wheel speed sensor 28 is provided in the vicinity of each vehicle wheel 5FR, 5FL, 5RR and 5FL and is connected to the hybrid ECU 5 for communicable therewith, thereby detecting the vehicle wheel speed and sending the detected result to the hybrid ECU 5.

(The Brake ECU 4)

The brake ECU 4 is a well-known microprocessor which includes CPU, ROM, RAM and I/O and executes various calculations and controls based on the program memorized in the ROM. The brake ECU 4 is communicable with various sensors 28, 72 through 75 and controls the electro-magnetic valves 22, 25, 41, 42, 531 and 532 and motors 433 and 535.

The brake ECU 4 calculates the required braking force required by an operator of the vehicle based on the operation amount of the brake pedal 10 (movement amount of the input piston 13) detected by the stroke sensor 72 and a pressure which is equivalent of the operating force amount of the brake pedal 10 detected by the hydraulic pressure sensor 73 (reaction force pressure sensor). The brake ECU 4 obtains a maximum regeneration braking force from the hybrid ECU 5 after a predetermined time elapsed (for example, after several milliseconds). Further, the brake ECU 4 calculates the required hydraulic pressure braking force by means of calculation, such as by subtracting the required regeneration braking force which is equal to or less than the maximum regeneration braking force from the required braking force, or the like.

It is noted that when the change of increase ratio of the operating amount of the brake pedal 10 is equal to or less than a predetermined value and the increase ratio of the master pressure is equal to or less than a predetermined value (for example, 3 MPa/s), if the required braking force is less than the maximum regeneration braking force, the required hydraulic pressure braking force becomes zero (0). In other words, no hydraulic pressure braking force is generated at the hydraulic pressure braking force generating device 2. On the other hand, when the change of increase ratio of the operating amount of the brake pedal 10 is larger than the predetermined value and the increase ratio of the master pressure is larger than the predetermined value, the required hydraulic pressure braking force becomes larger in response to an amount exceeding the predetermined value of the increase ratio of the master pressure.

The brake ECU 4 calculates the servo pressure which corresponds to the pressure in the servo chamber 1A and the master pressure which corresponds to the pressure in the master chamber 1D and 1E.

When the brake ECU 4 generates and applies the hydraulic pressure braking force to the vehicle wheels 5FR, 5FL, 5RR and 5RL by the hydraulic pressure control portion 26 of the hydraulic pressure braking force generating device 2, the brake ECU 4 controls the pressure increasing valve 42 and the pressure decreasing valve 41 thereby to generate the servo pressure Ps in the servo chamber 1A. Then the first and the second master pistons 14 and 15 advance to pressurize the first and the second master chambers 1D and 1E, respectively. The hydraulic pressure (master pressure) in the first and the second master chambers 1D and 1E is supplied to the wheel cylinders 541 through 544 as the master pressure via the ports 11g and 11i, conduits 51 and 52 and the ABS actuator 53. Thus, the hydraulic pressure braking force is applied to the vehicle wheels 5FR, 5FL, 5RR and 5RL. As explained, the hydraulic pressure braking force generating device 2 can generate any given hydraulic pressure braking force regardless of the operating amount inputted to the brake pedal 10. The detail will be explained hereinafter.

When the brake pedal 10 is not depressed, the ball valve 442 closes the through passage 444a of the valve seat portion 444 and the first chamber 4A and the second chamber 4B are hydraulically separated from each other. Further, under such state, the pressure decreasing valve 41 is in open state and the pressure increasing valve 42 is in closed state.

The second chamber 4B is in communication with the servo chamber 1A via the conduit 163 and accordingly, the hydraulic pressure in the chamber 4B is kept equal to the hydraulic pressure in the servo chamber 1A. The second chamber 4B is in communication with the third chamber 4C via the passages 445c and 445d of the control piston 445 and accordingly, the second chamber 4B and the third chamber 4C are in communication with the reservoir 171 via the conduits 414 and 161. One end of the pilot chamber 4D is closed by the pressure increasing valve 42 and the other end is in communication with the reservoir 171 via the pressure decreasing valve 41. The pressures in the pilot chamber 4D and the second chamber 4B are kept to the same level.

From this state, when the brake pedal 10 is depressed by the operator of the vehicle, the brake ECU 4 executes a feedback control for the pressure decreasing valve 41 and the pressure increasing valve 42 based on the detection signal from the hydraulic pressure sensor 74 so that the braking force is controlled to be the required hydraulic pressure braking force. The brake ECU 4 controls the pressure decreasing valve in a closing direction and the pressure increasing valve in an opening direction.

By opening the pressure increasing valve 42, the accumulator 431 and the pilot chamber 4D establish fluid communication therebetween and by closing the pressure decreasing valve 41, the communication between the reservoir 171 and the pilot chamber 4D is interrupted. Therefore, the pressure (pilot pressure Pi) in the pilot chamber 4D increases by the highly pressurized braking fluid supplied from the accumulator 431. Due to this increase of the pilot pressure Pi, the control piston 445 is slidably moved in a direction of cylinder bottom surface side (in the arrow A3 direction). Then the tip end of the projection portion 445b of the control piston 445 is brought into contact with the ball valve 442 to close the passage 445d. Thus, the fluid communication between the second chamber 4B and the reservoir 171 is interrupted.

Further movement of the control piston 445 towards the cylinder bottom surface side (in the arrow A3 direction side), the ball valve 442 is pushed by the projection portion 445b towards the cylinder bottom surface side (in the arrow A3 direction side) and is separated from the valve seat portion 444. Thus, the first chamber 4A and the second chamber 4B establish fluid communication through the through passage 444a of the valve seat portion 444. Since the first chamber 4A is connected to the accumulator 431 to be supplied with a high pressure braking fluid therefrom, the pressure in the second chamber 4B is increased due to the establishment of fluid communication between the chambers 4A and 4B.

Corresponding to the pressure increasing in the second chamber 4B, the pressure (servo pressure Ps) in the servo chamber 1A which is in fluid communication with the second chamber 4B is also increased. By the increase of the servo pressure Ps, the first master piston 14 advances and the pressure (master pressure) of the first master chamber 1D is increased. Then the second master piston 15 advances and the pressure (master pressure) of the second master chamber 1E is also increased. By this increase of the pressure (master pressure) of the first master chamber 1D, the highly pressurized braking fluid is supplied to the ABS actuator 53. Thus, the braking operation is performed on the vehicle by supplying the wheel cylinders 541 through 544 with a high pressure (master pressure) through the ABS actuator 53. The force which moves the first master piston 14 corresponds to the force corresponding to the servo pressure Ps.

When the braking operation is released, the pressure decreasing valve 41 is opened and the pressure increasing valve 42 is closed thereby to establish communication between the reservoir 171 and the pilot chamber 4D. Thus, the control piston 445 is retreated and returns to the state before the driver of the vehicle operates the brake pedal 10.

(Regeneration Braking Force Generating Device 3)

The regeneration braking force generating device 3 includes the motor/generator 31, the battery 33 and the inverter 32. The motor/generator 31 functions as a motor which generates a rotation drive force when the electricity is supplied and functions as a generator which generates electricity when a rotation force is supplied thereto. The motor/generator 31 is for example, an AC synchronizing type motor and rotatably connected to the both front vehicle wheels 5FR and 5FL. The inverter 32 converts the AC electric power generated by the motor/generator 31 into the DC electric power and is charged in the battery 33 and converts the DC current in the battery 33 into the AC current to supply the motor/generator 31 with the converted DC current.

The hybrid ECU 5 is a well-known microprocessor including CPU, ROM, RAM and I/O (Input/output interface) and executes various calculations and controls based on the programs stored in the ROM. The hybrid ECU 5 is communicable with the brake ECU 4 and the hybrid ECU 5 control the charge state of the battery 33. Further, the hybrid ECU 5 calculates the vehicle speed V which is a speed of the vehicle based on the detection signal from the wheel speed sensor 28 and outputs the calculated vehicle speed V to the brake ECU 4.

Figure 2:
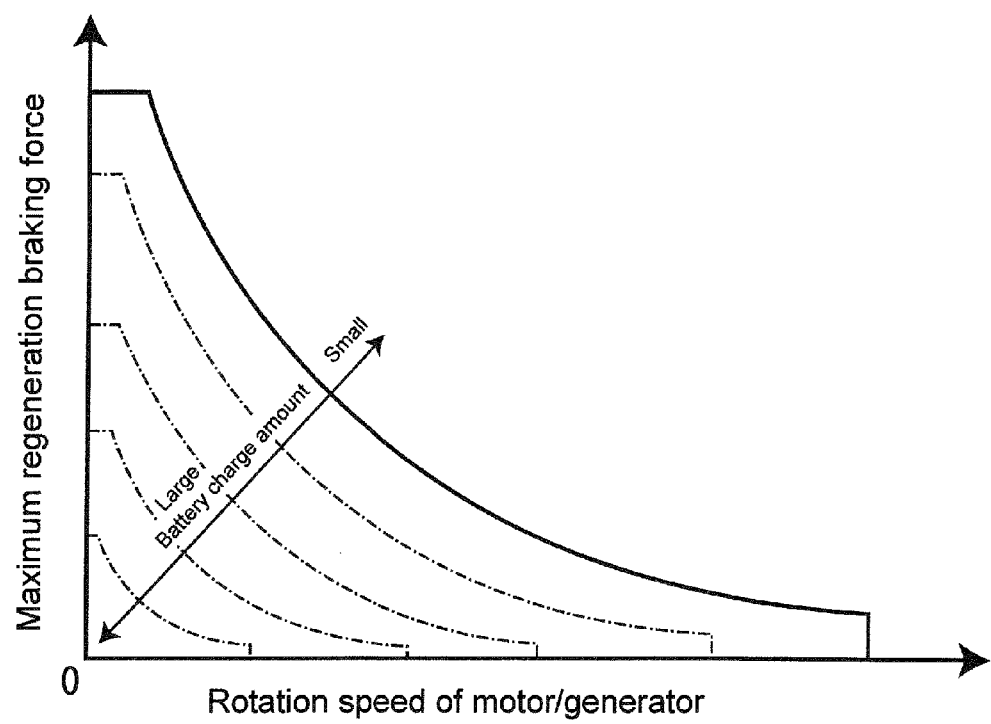
FIG. 2 is a mapping data indicating the relationship between the rotation speed of the motor/generator and the maximum regeneration braking force.

The hybrid ECU 5 calculates the maximum regeneration braking force and outputs the calculated maximum regeneration braking force to the brake ECU 4 after a predetermined time lapsed. The maximum regeneration braking force means the maximum braking force that the regeneration braking force generating device can generate at circumstances of the time. The hybrid ECU 5 calculates the rotation speed of the motor/generator 31 based on the vehicle speed V and calculates the maximum regeneration braking force by referencing the rotation speed of the motor/generator 31 and the charged amount (SOC: State Of Charge) of the battery 33 to the mapping data illustrated in FIG. 2. As shown in FIG. 2, smaller the rotation speed of the motor/generator 31, larger the maximum regeneration braking force is calculated and smaller the SOC, larger the maximum regeneration braking force is calculated.

The hybrid ECU 5 executes the regeneration braking force control in cooperation with the brake ECU 4. More specifically, the hybrid ECU 5 generates electricity by driving the motor/generator 31 by the rotation force of the front vehicle wheels 5FR and 5FL based on the required regeneration braking force obtained from the brake ECU 4 and generates the required regeneration braking force by the electricity generated by the motor/generator 31. In other words, the vehicle kinetic energy is converted into the electric energy by the motor/generator 31 and the inverter 32 and charged in the battery 33.

(Explanation of the Braking Force Adjusting Control)

Next, the operation of the vehicle braking device will be explained hereinafter with the flowchart in FIG. 3 and the time flow in FIG. 4. It is noted here that since the performance of regeneration braking force follows the performance of required regeneration braking force with substantially no delay, both regeneration braking force and required regeneration braking force are illustrated in FIG. 4 in one overlapping line. Further it is noted that the actual braking force means the sum of the regeneration braking force and the hydraulic pressure braking force.

When the vehicle becomes in a runnable state, the regeneration cooperation control starts and the program goes to the step S11. At the step S11, when the brake ECU 4 judges that the master pressure in the first and the second master chambers 1D and 1E, in other words, the servo pressure generated by the servo pressure generating device 40 is equal to or less than a first set value (S11: YES), the brake ECU 4 advances the program to the step S12 and when the brake ECU 4 judges that the master pressure is more than the first set value (S11: NO), the process at the step S11 is repeated. It is noted that the first set value is set to be a predetermined set value which value is close to zero.

At the step S12, when the brake ECU 4 judges that the required braking force inclination which is the value of time differentiated required braking force is equal to or less than a second set value, the program goes to the step S13 and when the required braking force inclination is more than the second set value (S12: NO), the brake ECU 4 returns the program to the step S11. The second set value is the value set in advance not to exceed the upper limit value. The upper limit value means the value of required braking force inclination appropriate to perform cooperative control between the regeneration braking force and the hydraulic pressure braking force.

At the step S13, when the brake ECU 4 judges that the required regeneration braking force is equal to or more than a third set value (S13: YES), the program goes to the step S14 and when the required regeneration braking force is less than the third set value (S13: NO), the program returns to the step S11. It is noted that the third set value is set to be a predetermined ratio (for example 80%) of the maximum regeneration braking force.

At the step s14, the brake ECU 4 executes braking force adjusting control. In more detail, the brake ECU 4 limits the increase ratio of the required regeneration braking force to limit the increase ratio of the regeneration braking force generated at the regeneration braking force generating device 3 (See numeral 1 in FIG. 4). At the same time, the brake ECU 4 increases the required hydraulic pressure braking force (See numeral 2 in FIG. 4) to increase the hydraulic pressure braking force generated at the hydraulic pressure braking force generating device 2. The brake ECU 4 proportionally distributes the increased amount of the required braking force with a predetermined ratio (such as for example, 50% to 50%) for a detecting period of time (for example 100 ms) (See numeral 3 in FIG. 4) from the present time back to a predetermined set time and calculates the increased amount of the required regeneration braking force and the increased amount of the required hydraulic pressure braking force. The detecting time period is determined and time-shifted every time the process of the step S14 is executed. After the process at the step S14 is finished, the program returns to the step S11.

(Advantageous Effects of the Embodiments)

As explained, according to the vehicle braking device of the embodiments, at the step S14, the brake ECU 4 (braking force adjusting control device) limits the increase ratio of the regeneration braking force (See numeral 1 in FIG. 4) and at the same time increases the hydraulic pressure braking force (See numeral 2 in FIG. 4) before the current regeneration braking force reaches to the maximum regeneration braking force. Thus, since the hydraulic pressure braking force is increased ((See numeral 2 in FIG. 4) before the regeneration braking force hits the ceiling (See numeral 4 in FIG. 4), the drop of the increase ratio of the actual braking force accompanied by the time lag (time delay) of the increase of the hydraulic pressure braking force can be minimized, which can prevent the delay of increase of vehicle deceleration. Accordingly, the divergence between the actual braking force which is the sum of the hydraulic pressure braking force and the regeneration braking force and the required braking force which may occur when the regeneration braking force hits the ceiling can be reduced to avoid occurrence of different braking feeling by an operator of the vehicle.

An unexpected generation of change of the actual braking force can be prevented which occurs due to an insufficient time period caused by a time lag between the actual braking force which is the sum of the hydraulic pressure braking force and the regeneration braking force and the required braking force. Such time lag occurs by the time actually the hydraulic pressure braking force is generated after the instructions to generate the hydraulic pressure braking force, when the hydraulic pressure braking force is generated in order to cover all of the increase of the actual braking force by the hydraulic pressure braking force to agree the actual braking force to the required braking force after the regeneration braking force hit the ceiling. Further, since the increase ratio of the regeneration braking force is limited in advance before the regeneration braking force hits the ceiling, an excess increase of the vehicle deceleration which is caused by the actual braking force exceeding the required braking force accompanied by the increase of the hydraulic pressure braking force can be prevented.

Figure 3:
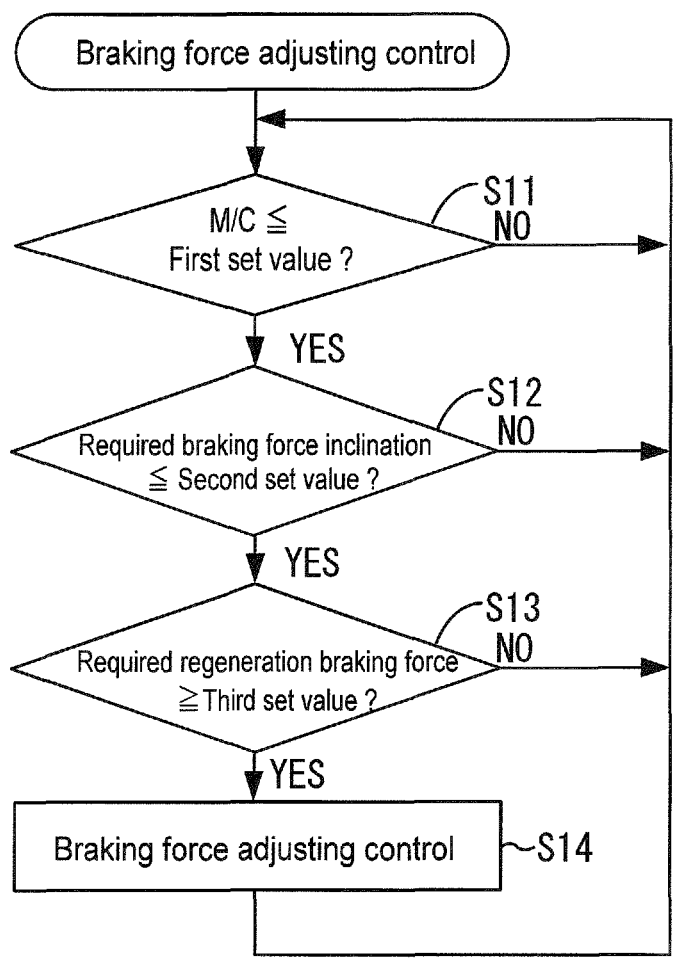
FIG. 3 is a flowchart of the braking force adjusting control which brake ECU executes.
Figure 4:
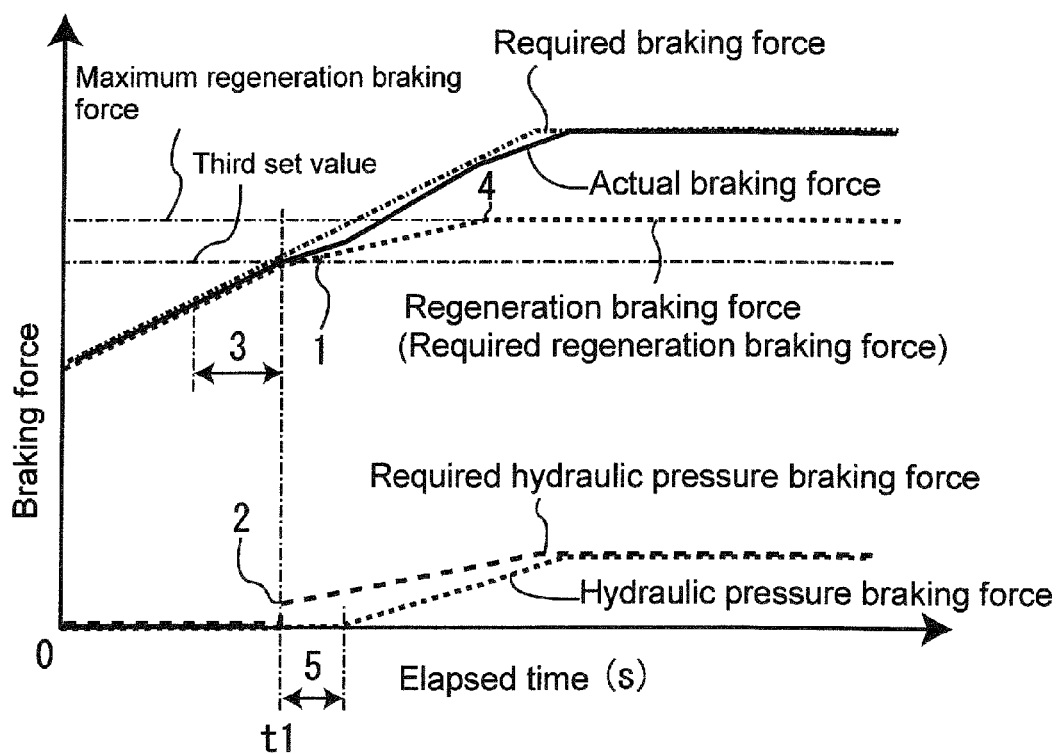
FIG. 4 is a graph explaining the embodiment of the invention and showing a time elapsed with a horizontal axis and various braking forces with a vertical axis.

At the step S14 in FIG. 3, the brake ECU 4 calculates the increase amount of the regeneration braking force and the increase amount of the hydraulic pressure braking force at the braking force adjusting control based on the increase amount of the required braking force for the detecting time period from the present time back to the predetermined set time (when the present time is represented as the "t1" as shown in FIG. 4, the detecting time is represented as the arrow 3). Accordingly, the quick change of the regeneration braking force and the hydraulic pressure braking force relative to the change of operation amount of the brake pedal 10 (brake operating member) by the operator of the vehicle can be minimized. This will eventually minimize the wear of various parts forming the regeneration braking force generating device 3 and the hydraulic pressure braking force generating device 2. The regeneration braking force generated by the regeneration braking force generating device 3 can quickly respond to the change of the required regeneration braking force. However, according to the embodiments of the invention, the vehicle shocks generated accompanied by the quick change of the regeneration braking force can be prevented.

Further, when the brake ECU 4 judges that the required braking force inclination which is the value of time differentiated required braking force before executing the braking force adjusting control is larger than the second set value (S12: NO judgment), the braking force adjusting control is not executed. Generally, more the required braking force inclination, more the ratio of the hydraulic pressure braking force increases and the hydraulic pressure braking force has been already generated. When the hydraulic pressure braking force has been already generated, no time lag is generated between the regeneration braking force and the hydraulic pressure braking force even the regeneration braking force hits the ceiling. Accordingly, insufficient vehicle deceleration would not occur due to the existence of already generated hydraulic pressure braking force. Therefore, insufficient deceleration would not occur without execution of the braking force adjusting control. Thus, when the required braking force inclination is larger than the predetermined value, the braking force adjusting control is not executed and the increase ratio of the regeneration braking force is not limited. Accordingly, more kinetic energy is converted into the electric energy by the regeneration braking force generating device 3.

When the brake ECU 4 judges that the master pressure in the first and the second master chambers 1D and 1E, in other words, the servo pressure generated by the servo pressure generating device 40 is larger than the first set value, the braking force adjusting control is not executed. When the hydraulic pressure braking force is generated more than the predetermined value, (at the step S11: NO), no time lag is generated for the generation of the hydraulic pressure braking force, even the regeneration braking force hits the ceiling. Accordingly, insufficient vehicle deceleration would not occur due to the existence of already generated hydraulic pressure braking force. Therefore, insufficient deceleration would not occur without execution of the braking force adjusting control. Thus, when the hydraulic pressure braking force before the execution of braking force adjusting control is larger than the predetermined value, the braking force adjusting control is not executed and the increase ratio of the regeneration braking force is not limited. Accordingly, more kinetic energy is converted into the electric energy by the regeneration braking force generating device 3.

Further, the brake ECU 4 (maximum regeneration braking force obtaining means) obtains the maximum regeneration braking force from the hybrid ECU 5 (regeneration braking force control device) which controls the regeneration braking force generating device 3. Further, the brake ECU 4 (braking force adjusting control means) executes the braking force adjusting control at the step S14 in FIG. 3 when the current regeneration braking force reached to the predetermined ratio of the maximum regeneration braking force (S13: YES in FIG. 4). Since the hybrid ECU 5 controls the regeneration braking force generating device 3 directly, a highly accurate maximum regeneration braking force can be obtained based on the rotation speed of the motor/generator 31 and the remaining amount of the battery 33. Further, since the brake ECU 4 obtains the maximum regeneration braking force from the hybrid ECU 5, the brake ECU 4 can properly judge the timing of the start of braking force adjusting control with high accuracy. Accordingly, the braking force adjusting control is surely started before the regeneration braking force reached to the peak and therefore, more assuredly the vehicle deceleration can be increased. Still further, more kinetic energy is converted into the electric energy by the regeneration braking force generating device 3.

When the hydraulic pressure braking force is generated from the state that no hydraulic pressure braking force is generated, the generation of the hydraulic pressure braking force is time lagged. This time lag is caused by the time delay of increasing the wheel cylinder pressure, time for contact of the wheel cylinders 541 through 544 and the brake pad with the brake disc or the time for contact of the brake shoes with the brake drum. According to the embodiment of the invention, the bake ECU 4 increases the required hydraulic pressure braking force suddenly to prevent time lag generation at the step S14 in FIG. 3.

(Comparative Example)

Figure 5:
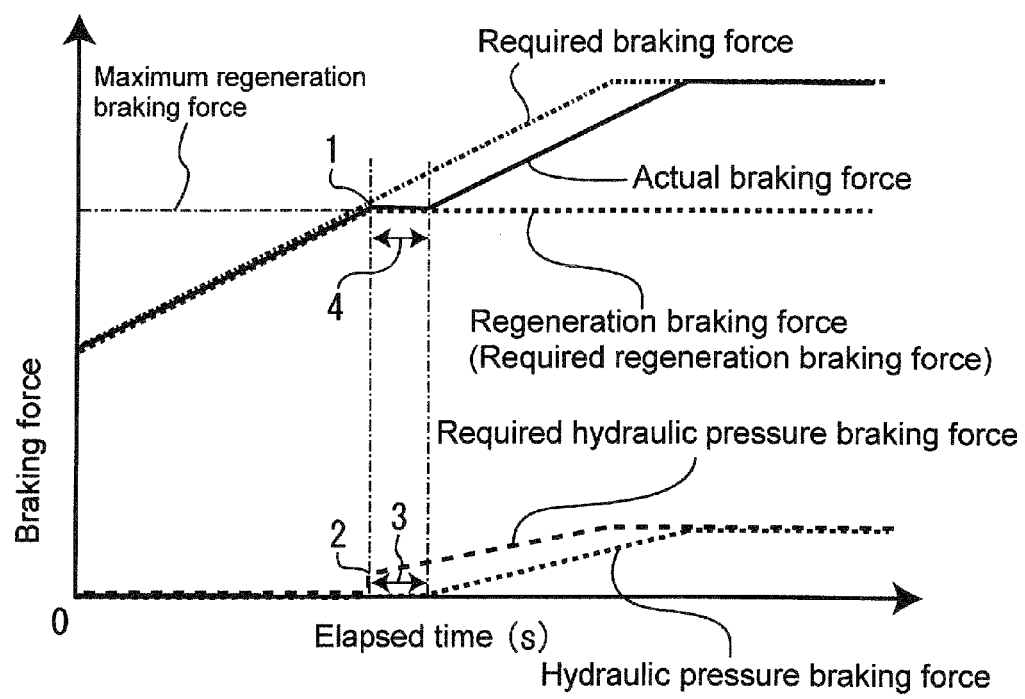
FIG. 5 is a graph explaining the comparative example and showing a time elapsed with a horizontal axis and various braking forces with a vertical axis.

A comparative example will be explained with reference to FIG. 5. Conventionally, the required hydraulic pressure braking force is increased after detecting the timing (FIG. 5, numeral 2) when the regeneration braking force hits a ceiling (FIG. 5, numeral 1). A slight time lag is generated from the increasing of the required hydraulic pressure braking force to the actual increase of the hydraulic pressure braking force (FIG. 5, numeral 3). Therefore, a time lag is generated when the actual braking force is increased again after the regeneration braking force hits the ceiling (FIG. 5, numeral 4).

On the other hand, according to the embodiment, the hydraulic pressure braking force is increased (FIG. 4, numeral 2) before the regeneration braking force reached to the peak value (FIG. 4, numeral 4). The drop of increase ratio of the actual braking force accompanied by the reaching of the regeneration braking force to the peak value can be prevented. Thus, the time lag explained above can be prevented.

(Other Embodiments)

According to the embodiment explained above, the hybrid ECU 5 calculates the maximum regeneration braking force and the brake ECU 4 obtains the maximum regeneration braking force from the hybrid ECU 5. However, it may be designed that the brake ECU 4 itself calculates the maximum regeneration braking force based on the vehicle speed V or the rotation speed of the motor/generator 31 and the remaining amount of the battery 33 and the brake ECU 4 executes braking force adjusting control when the current regeneration braking force reached to the predetermined ratio (for example 60%) of the maximum regeneration braking force. In this embodiment, the braking force adjusting control can be executed for a vehicle braking device in which the maximum regeneration braking force is not obtained from the hybrid ECU 5 (regeneration braking force control device) which controls regeneration braking force generation device 3. Accordingly, the embodiment of the invention can be applicable to a wide range of vehicles.

According to the embodiment explained above, the brake ECU 4 increases the required hydraulic pressure braking force at the same time limits the increase ratio of the required regeneration braking force at the step S14 shown in FIG. 4. However, the limiting of the increase ratio of the required regeneration braking force and the increasing of the required hydraulic pressure braking force may be performed at different timing. A time lag is generated (FIG. 4, numeral 5) between the outputting of instructions to increase the required hydraulic pressure braking force by the brake ECU 4 and the actual increase of the hydraulic pressure braking force. Therefore, the brake ECU 4 estimates by calculation the time that the required regeneration braking force or the regeneration braking force reaches to the maximum regeneration braking force and increases the required hydraulic pressure braking force at the timing before by the estimated time. According to this embodiment, the vehicle deceleration decrease accompanied by reaching of the regeneration braking force to the peak value can be further assuredly minimized.

Or, the brake ECU 4 may estimate by calculation the time the required regeneration braking force reaches to the third set value and increase the required hydraulic pressure braking force before the timing by the time lag. According to this embodiment, the decrease of the vehicle deceleration can be assuredly prevented due to the increase of the hydraulic pressure braking force at the time of limiting of increase ratio of the regeneration braking force.

According to the embodiment explained above, the hybrid ECU 5 controls the battery 33 charging state. However, another ECU different from the hybrid ECU 5 may be provided to control the battery 33 charging state. Further, both brake and hybrid ECUs may be formed integrally.

According to the embodiment explained above, at the step S11 in FIG. 4, the brake ECU 4 judges that the master pressure is equal to or less than the first set value and then judges that the hydraulic pressure braking force is equal to or less than the predetermined value. However, the brake ECU 4 may judge whether the hydraulic pressure braking force is equal to or less than a predetermined value by judging whether the wheel cylinder pressure which corresponds to the pressures in the wheel cylinders 541 through 544 is equal to or less than a predetermined value or by judging whether the required hydraulic pressure braking force is equal to or less than a predetermined value.

According to the embodiment explained above, at the step S13 in FIG. 4, the brake ECU 4 judges that the required regeneration braking force is equal to or more than the third set value. However, the brake ECU 4 may obtain the information on the regeneration braking force generated actually at the regeneration braking force generating device 3 and judge whether the regeneration braking force is equal to or more than a predetermined value.

According to the embodiment explained above, the stroke sensor 72 and the hydraulic pressure sensor 73 are used for detecting the operating amount of the brake pedal 10. However, it may be possible to use a sensor which detects a movement amount of input piston 13, as the brake operation amount detecting means.

According to the embodiment explained above, the motor/generator has both motor and generator functions. However, a motor and a generator may be rotatably and independently connected to the vehicle wheel.

A reduction gear transmission which deceleration ratio can be variable, may be provided between the motor/generator 31 and the left/right front wheels 5FR and 5FL. According to this embodiment, the hybrid ECU 5 calculates the maximum regeneration braking force by referring the rotation speed of the motor/generator 31 and the battery charged amount (SOC) with the mapping data indicated in FIG. 2.

According to the embodiment explained above, the motor/generator 31 drives the left/right front wheels 5FR and 5FL. However, the motor/generator 31 may drive the left/right rear wheels.

According to the embodiment explained above, the hydraulic pressure braking force generating device 2 is formed such that an area where the depression force by the operator of the vehicle would not be directly reflected until the depression amount of the brake pedal 10 reaches to a predetermined value and that after the brake pedal 10 depression amount exceeds the predetermined value, the master pressure is generated. However, a hydraulic pressure braking force generating device as disclosed in "JP2011-240873 A" may be used. Such hydraulic pressure braking force generating device as disclosed in the JP2011-240873 A includes a pump which generates hydraulic pressure, an accumulator which accumulates the generated hydraulic pressure therein and a linear valve which adjusts the hydraulic pressure. According to the hydraulic pressure braking force generating device, the servo pressure is generated by adjusting the accumulated hydraulic pressure in the accumulator by the linear valve and the master cylinder is moved by the servo pressure to generate the cylinder pressure.

According to the embodiment explained above, a transmitting member which transmits the operation force of the operator of the vehicle to the input piston 13 is a brake pedal 10.

However, such member which transmits the operating force is not limited to the brake pedal 10, but brake lever and brake handle may be used.

The invention claimed is:

1. A vehicle braking device comprising:
a hydraulic pressure braking force generating device for supplying a wheel cylinder provided at a corresponding vehicle wheel with a braking fluid and generating a hydraulic pressure braking force thereby at the vehicle wheel;
a regeneration braking force generating device for generating a regeneration braking force at the vehicle wheel by a generator rotatably connected to the vehicle wheel;
a brake operating member;
a brake operating amount detecting means for detecting an operating amount of the brake operating member; and
a required braking force calculating means for calculating a required braking force based on the operating amount of the brake operating member detected by the brake operating amount detecting means, whereby the required braking force is applied to the vehicle wheel by controlling the hydraulic pressure braking force generating device and the regeneration braking force generating device, the vehicle braking device-further comprising:
a braking force adjusting control means for executing a braking force adjusting control,
in which a required hydraulic pressure braking force, defined to be a braking force obtained by subtracting a current required regeneration braking force from the calculated required braking force, is increased by increasing the current required regeneration braking force as the required braking force is increased towards a maximum regeneration braking force which corresponds to a maximum braking force that the regeneration braking force generating device can generate and limiting an increase ratio of the required regeneration braking force before the required regeneration braking force reaches the maximum regeneration braking force, wherein
the braking force adjusting control means does not execute the braking force adjusting control and does not limit the increase ratio of the required regeneration braking force when a time differentiated value of the required braking force before an execution of braking force adjusting control is larger than a predetermined value.

2. The vehicle braking device according to claim 1, wherein the braking force adjusting control means calculates an increase amount of the regeneration braking force and an increase amount of the hydraulic pressure braking force under the execution of the braking force adjusting control based on the increase amount of the required braking force for a time period from a current time back to a predetermined time therefrom.

3. The vehicle braking device according to claim 1, wherein the braking force adjusting control means does not execute the braking force adjusting control and does not limit the increase ratio of the required regeneration braking force when the hydraulic pressure braking force before the execution of braking force adjusting control is larger than a predetermined value.

4. The vehicle braking device according to claim 1, wherein the vehicle braking device further includes a maximum regeneration braking force obtaining means which obtains the maximum regeneration braking force by a regeneration braking force control device which controls the regeneration braking force generating device by outputting the regeneration braking force, wherein
the braking force adjusting control means executes the braking force adjusting control when a current regeneration braking force reaches to a predetermined ratio of the maximum regeneration braking force.

5. The vehicle braking device according to claim 1, wherein the vehicle braking device further includes a maximum regeneration braking force calculating means which calculates the maximum regeneration braking force based on a vehicle speed or a rotation speed of the generator, wherein
the braking force adjusting control means executes the braking force adjusting control when a current regeneration braking force reaches to a predetermined ratio of the maximum regeneration braking force.

\* \* \* \* \*